US010089708B2

(12) United States Patent
Gruber et al.

(10) Patent No.: US 10,089,708 B2
(45) Date of Patent: Oct. 2, 2018

(54) CONSTANT MULTIPLICATION WITH TEXTURE UNIT OF GRAPHICS PROCESSING UNIT

(71) Applicant: QUALCOMM Incorporated, San Diego, CA (US)

(72) Inventors: Andrew Evan Gruber, Arlington, MA (US); Lin Chen, San Diego, CA (US); Liang Li, San Diego, CA (US); Chunhui Mei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/141,519

(22) Filed: Apr. 28, 2016

(65) Prior Publication Data

US 2017/0316540 A1   Nov. 2, 2017

(51) Int. Cl.
*G06T 15/80* (2011.01)
*G06T 15/04* (2011.01)
*G06T 1/20* (2006.01)
*G06T 1/60* (2006.01)
*G06T 15/00* (2011.01)

(52) U.S. Cl.
CPC ............... *G06T 1/20* (2013.01); *G06T 1/60* (2013.01); *G06T 15/005* (2013.01); *G06T 15/04* (2013.01); *G06T 15/80* (2013.01); *G06T 2200/28* (2013.01)

(58) Field of Classification Search
None
See application file for complete search history.

(56) References Cited

U.S. PATENT DOCUMENTS

| 5,886,701 | A   | * | 3/1999  | Chauvin   | G06T 11/40 |
|           |     |   |         |           | 345/418    |
| 6,236,413 | B1  | * | 5/2001  | Gossett   | G06T 1/20  |
|           |     |   |         |           | 345/426    |
| 6,366,290 | B1  |   | 4/2002  | Dye et al. |           |
| 7,274,373 | B1  |   | 9/2007  | Bastos et al. |        |
| 7,486,290 | B1  | * | 2/2009  | Kilgariff | G06T 15/005 |
|           |     |   |         |           | 345/419    |
| 2004/0075661 | A1 | * | 4/2004 | Yamaguchi | G06T 1/20 |
|           |     |   |         |           | 345/441    |
| 2005/0259104 | A1 | * | 11/2005 | Koguchi  | G06T 15/04 |
|           |     |   |         |           | 345/552    |

(Continued)

FOREIGN PATENT DOCUMENTS

WO   9641314 A1   12/1996

OTHER PUBLICATIONS

Rakos, "Efficient Gaussian blur with linear sampling," Sep. 2010, 17 pp.

(Continued)

*Primary Examiner* — Joni Richer
(74) *Attorney, Agent, or Firm* — Shumaker & Sieffert, P.A.

(57) ABSTRACT

A texture unit of a graphics processing unit (GPU) may receive a texture data. The texture unit may receive the texture data from the memory. The texture unit may also multiply, by a multiplier circuit of the texture unit, the texture data by at least one constant, where the constant is not associated with a filtering operation, and where the texture data comprises at least one texel. The texture unit may also output, by the texture unit, a result of multiplying the texture data by the at least one constant.

27 Claims, 4 Drawing Sheets

(56) References Cited

U.S. PATENT DOCUMENTS

| | | | | |
|---|---|---|---|---|
| 2006/0028482 A1* | 2/2006 | Donovan | ............... | G06T 15/04 345/586 |
| 2006/0125825 A1* | 6/2006 | Law | ............... | G06T 15/005 345/426 |
| 2007/0279434 A1* | 12/2007 | Fujita | ............... | G06T 15/04 345/611 |
| 2009/0147017 A1* | 6/2009 | Jiao | ............... | G06T 15/04 345/582 |
| 2009/0251476 A1* | 10/2009 | Jiao | ............... | G06F 9/383 345/543 |
| 2011/0025700 A1 | 2/2011 | Lee et al. | | |
| 2014/0267318 A1* | 9/2014 | Lum | ............... | G06T 15/005 345/506 |
| 2015/0084975 A1 | 3/2015 | Heinrich et al. | | |
| 2015/0228091 A1 | 8/2015 | Lee et al. | | |
| 2015/0279090 A1* | 10/2015 | Keramidas | ............... | G06T 15/503 345/505 |

OTHER PUBLICATIONS

Steen, "Utilizing Texture Units for Image Processing", May 2011, 27 pp. XP055222013, Retrieved from the Internet: URL: http://www.nvidia.de/content/PDF/isc-2011/Steen.pdf [retrieved on Oct. 19, 2015] Slide 3 Slides 6-7 Convolution filters.

Ewins J.P., et al., "Implementing an Anisotropic Texture Filter", Computers and Graphics, Elsevier, GB, vol. 24, No. 2, Apr. 1, 2000 (Apr. 1, 2000), XP004236371, pp. 253-267.

Ewins J.P., et al., "MIP-MAP Level Selection for Texture Mapping", IEEE Transactionson Visualization and Computer Graphics, IEEE Service Center, Los Alamitos, CA, US, vol. 4, No. 4, Oct. 1, 1998 (Oct. 1, 1998), XP000831199, pp. 317-329.

International Search Report and Written Opinion—PCT/US2017/021628—ISA/EPO—dated May 15, 2017.

Kilgariff E., et al., "The GeForce 6 Series GPU Architecture", 20050731-20050804, Jul. 31, 2005 (Jul. 31, 2005), XP058318201, pp. 29-es.

Knittel G., et al., "Hardware for Superior Texture Performance", Computers and Graphics, Elsevier, GB, vol. 20, No. 4, Jul. 1, 1996 (Jul. 1, 1996), XP004025141, pp. 475-481.

Nam B-G., et al., "Development of a 3-D Graphics Rendering Engine with Lighting Acceleration for Handheld Multimedia Systems", IEEE Transactions on Consumer Electronics, IEEE USA, vol. 51, No. 3, Aug. 2005 (Aug. 2005), XP002769836, pp. 1020-1027.

Response to Written Opinion dated May 15, 2017, from International Application No. PCT/US2017/021628, filed on Feb. 27, 2018, 18 pp.

"Sampler Object," Khronos.org, accessed from https://www.khronos.org/opengl/wiki/Sampler_Object, last edited Sep. 19, 2017, 7 pp.

Second Written Opinion from International Application No. PCT/US2017/021628, dated Mar. 29, 2018, 4 pp.

* cited by examiner

CONSTANT MULTIPLICATION WITH TEXTURE UNIT OF GRAPHICS PROCESSING UNIT

TECHNICAL FIELD

The present disclosure relates to using a texture unit of a graphics processing unit for multiplication operations.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. Converting information about 3D objects into a bit map that can be displayed is known as pixel rendering, and requires considerable memory and processing power. In some examples, GPUs may include one or more texture units and one or more shader processors. The texture units may be responsible for addressing and filtering textures. The shader processors may receive the filtered textures from the texture units and implement shader stages of a graphics rendering pipeline to perform pixel rendering.

SUMMARY

The techniques of this disclosure include modifying or expanding a texture unit (also referred to as a texture pipe, texture engine, or texture mapping unit) of a graphics processing unit to perform multiplication operations on filtered values. In an example, a texture unit may multiply each color value for a texel by a respective filter weight. The texture unit may then add the result of each of these multiplications together as a filtered value for a current texel. Rather than passing this filtered value to a shader processor to perform multiplication, the texture unit may also multiply the filtered value by a constant. Performing the multiplication with the texture unit may result in a power savings, because the shader processor does not need to be activated to perform the multiplication.

In one example, a method of processing graphics includes receiving, by a texture unit of a graphics processing unit (GPU), texture data, multiplying, by the texture unit, the texture data by at least one constant, wherein the constant is not associated with a filtering operation, and wherein the texture data comprises at least one texel, and outputting, by the texture unit, a result of multiplying the texture data by the at least one constant.

In another example, a computing device for processing graphics includes a memory configured to store texture data, and a texture unit configured to receive the texture data from the memory, multiply, by a multiplier circuit of the texture unit, the texture data by at least one constant, wherein the constant is not associated with a filtering operation, and wherein the texture data comprises at least one texel, and output, by the texture unit, a result of multiplying the texture data by the at least one constant.

In another example, a non-transitory computer-readable medium has instructions stored thereon that, when executed, cause one or more processors to receive, by a texture unit of a graphics processing unit (GPU), texture data, multiply, by the texture unit, the texture data by at least one constant, wherein the constant is not associated with a filtering operation, and wherein the texture data comprises at least one texel, and output, by the texture unit, a result of multiplying the texture data by the at least one constant.

The details of one or more aspects of the present disclosure are set forth in the accompanying drawings and the description below. Other features, objects, and advantages of the present disclosure will be apparent from the description and drawings, and from the claims.

DETAILED DESCRIPTION

Figure 1:
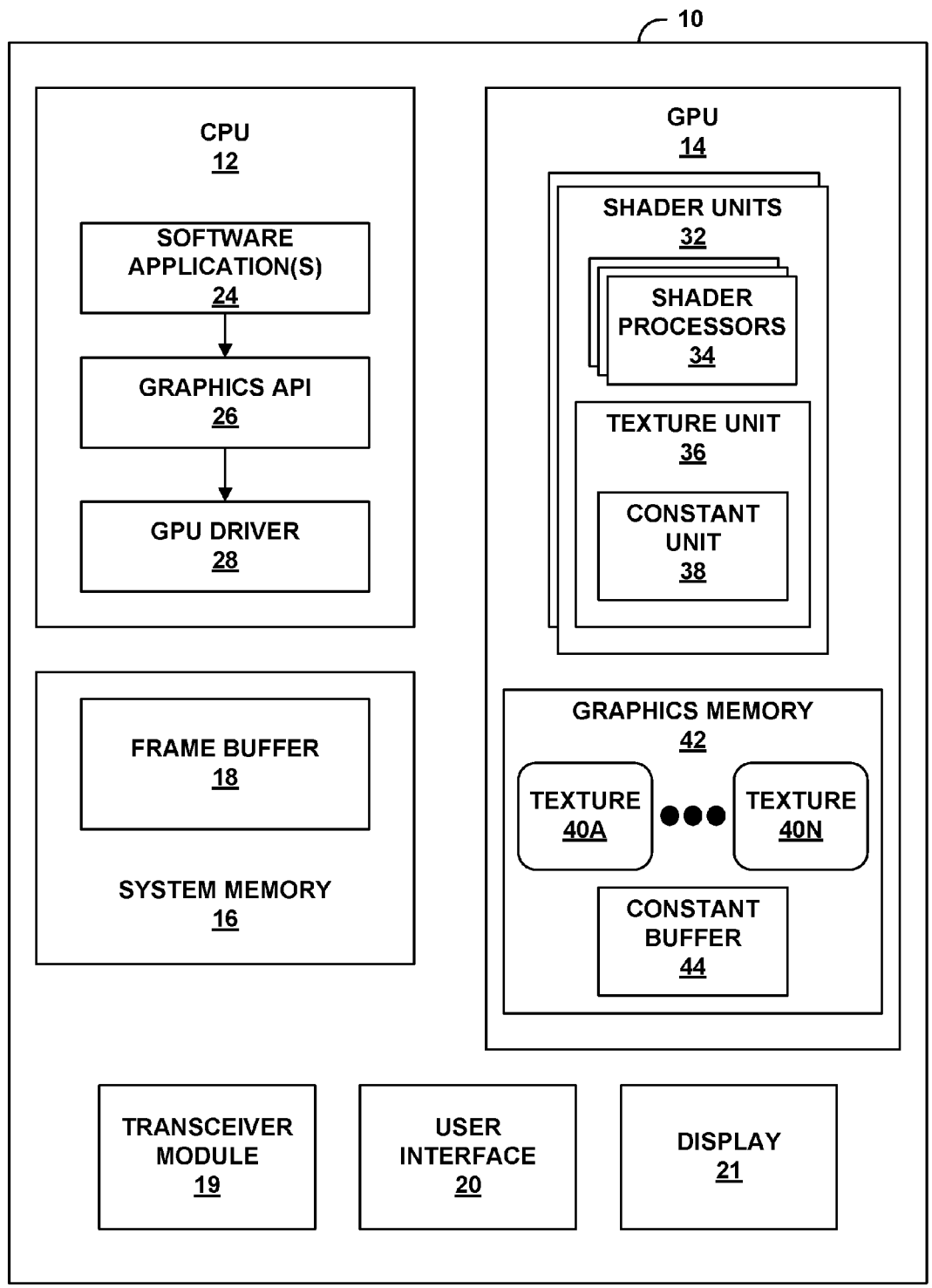
FIG. 1 is a block diagram illustrating an example computing device that may be configured to implement one or more aspects of this disclosure.

A GPU may apply and render one or more textures to each polygon of a scene. As part of rendering the scene, the GPU may be configured to filter the textures before converting a three-dimensional representation of the scene to a two-dimensional grid of pixels, a process referred to as rasterization.

Texture filtering or texture smoothing may be used to determine the texture color for a texture mapped pixel using the colors of nearby texels. In general, texels (also referred to as texture elements) may be the fundamental units of texture space. A texture may be represented by an array of texels, which contain color and/or alpha values (e.g., transparency values or opacity values) for a particular texture in a particular colorspace. Mathematically, texture filtering may be considered to be a type of anti-aliasing. However, texture filtering may be directed to filtering out high frequencies from the texture fill, whereas other anti-aliasing techniques may generally focus on visual edges. In general, texture filtering allows a texture to be applied at many different shapes, sizes and angles while minimizing blurriness, shimmering and blocking. Example texture filtering techniques include bilinear filtering and trilinear filtering.

Filtering may be performed by a texture unit, which may be included as part of a pixel processing pipeline. The texture unit may include both programmable and fixed function hardware designed to apply textures (texels) to pixels. The texture unit may include dedicated hardware for performing texture filtering, whereby one or more texel values are multiplied by one or more filter coefficient values. The texture unit may store filtering results in an accumulator, and add the filtering results to produce a final filtered texel.

In some instances, filtered texels may be multiplied by a constant value after filtering. For example, a constant associated with a color or lighting gain may be applied to filtered texels. To apply the constant, the texture unit may pass the filtered texels to a shader processor (also referred to as a shader pipe), which uses arithmetic logic units (ALUs) to multiply the received texels by the constant value. However, the shader processor may consume a relatively large amount of power and may include a number of components that are not necessary to perform the multiplication operation. Accordingly, powering the entire shader processor to multiply texture data by a constant may be relatively inefficient.

The techniques of this disclosure include modifying and/or expanding a texture unit (or texture engine) to perform multiplication operations on filtered texel values. In an example, a texture unit may multiply each color value for a texel by a respective filter weight. The texture unit may then add the result of each of these multiplications together as a filtered value for a current texel. Rather than passing this filtered value to a shader processor to apply a constant, the texture unit may also multiply the filtered value by a constant. Performing the multiplication with the texture unit may save power, because the shader processor does not need to be activated to perform the multiplication. That is, the texture unit may bypass the shader processor, which allows the shader processor to remain powered down (or performing another task) during the texture filtering operation.

In some examples, a texture unit may be expanded to include separate multiplier logic. In other examples, a multiplier circuit of a texture unit may be configured to perform both a filtering function and a constant multiplication function. In such examples, a multiplexer may be used to select the appropriate function. For example, a multiplexer may be used to determine whether to apply a trilinear weight to a texel or a constant to a texel using the same multiplier unit.

A constant buffer may store the constants being applied by the texture unit. The texture unit may incorporate logic that provides flexibility in the manner in which constants are applied to texture values. For example, the texture unit may incorporate logic that allows different constant values to be applied to respective texture values of a particular texel.

FIG. 1 is a block diagram illustrating an example computing device 10 that may be configured to implement one or more aspects of this disclosure. Computing device 10 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like.

In the example of FIG. 1, computing device 10 includes central processing unit (CPU) 12, GPU 14, and system memory 16. Computing device 10 also includes transceiver module 19, user interface 20, and display 21. It should be understood, however, that other examples of computing device 10 may include more, fewer, or an alternative arrangement of components than those shown.

For example, computing device 10 may include a speaker and a microphone, neither of which are shown in FIG. 1, to effectuate telephonic communications in examples where computing device 10 is a mobile wireless telephone, or a speaker where computing device 10 is a media player. Computing device 10 may also include a video camera. In another example, certain units such as transceiver module 19 or a display processor associated with display 21 may be part of the same integrated circuit (IC) as CPU 12 and/or GPU 14, may both be external to the IC or ICs that include CPU 12 and/or GPU 14, or may be formed in the IC that is external to the IC that includes CPU 12 and/or GPU 14.

CPU 12 may comprise a general-purpose or a special-purpose processor that controls operation of computing device 10. For example, CPU 12 may include one or more processors, such as one or more microprocessors, application specific integrated circuits (ASICs), field programmable gate arrays (FPGAs), digital signal processors (DSPs), or other equivalent integrated or discrete logic circuitry. As described in greater detail below, CPU 12 may issue one or more graphics rendering commands to GPU 14 to cause GPU 14 to render graphics data.

GPU 14 may include a programmable pipeline of processing components having a highly-parallel structure that provides efficient processing of complex graphic-related operations. GPU 14 may include one or more processors, such as one or more microprocessors, application specific integrated circuits (ASICs), field programmable gate arrays (FPGAs), digital signal processors (DSPs), or other equivalent integrated or discrete logic circuitry. GPU 14 may also include one or more processor cores, such that GPU 14 may be referred to as a multi-core processor. GPU 14 may, in some instances, be integrated into a motherboard of computing device 10. In other instances, GPU 14 may be present on a graphics card that is installed in a port in the motherboard of computing device 10 or may be otherwise incorporated within a peripheral device configured to interoperate with computing device 10.

GPU 14 may output rendered data to system memory 16, e.g., frame buffer 18 of system memory 16. System memory 16 may store an operating system (not shown) that controls the operation of components of computing device 10. System memory 16 may also be used by software or applications (as described below) executed by computing device 10 to store information during program execution. System memory 16 may include a computer-readable storage medium or computer-readable storage device. In some examples, system memory 16 may include one or more of a short-term memory or a long-term memory. System memory 16 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

Frame buffer 18 stores destination pixels for GPU 14. Each destination pixel may be associated with a unique screen pixel location. In some examples, frame buffer 18 may store color components and a destination alpha value for each destination pixel. For example, frame buffer 18 may store Red, Green, Blue, Alpha (RGBA) components for each pixel where the "RGB" components correspond to color values and the "A" component corresponds to a destination alpha value (e.g., a transparency value that may be used in compositing, which may also be referred to as opacity). Although frame buffer 18 and system memory 16 are illustrated as being separate memory units, in other examples, frame buffer 18 may be part of system memory 16.

Transceiver module 19 may include circuitry to allow wireless or wired communication between computing device 10 and another device or a network. Transceiver module 19 may include modulators, demodulators, amplifiers and other such circuitry for wired or wireless communication.

User interface 20 may allow a user to provide input to computing device 10. Examples of user interface 20 include, but are not limited to, a trackball, a mouse, a keyboard, and other types of input devices. User interface 20 may also be a touch screen and may be incorporated as a part of display 21.

Display 21 may display image content generated by GPU 14, e.g., such as rendered graphics data from frame buffer 18. Display 21 may be a liquid crystal display (LCD), an organic light emitting diode display (OLED), a cathode ray tube (CRT) display, a plasma display, or another type of display device. Display 21 may include a display processor that retrieves images from system memory 16 and outputs values that cause the pixels of display 21 to illuminate to display the image.

In operation, CPU 12 may execute one or more software applications 24. Software applications 24 may include any application that utilizes the functionality of GPU 14. For example, software applications 24 may include a graphical user interface (GUI) application, an operating system, a portable mapping application, a computer-aided design program for engineering or artistic applications, a video game application, or another type of software application that uses 2D or 3D graphics.

Software applications 24 may include one or more drawing instructions that instruct GPU 14 to render a graphical user interface (GUI) and/or a graphics scene. For example, the drawing instructions may include instructions that define a set of one or more graphics primitives to be rendered by GPU 14. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software applications 24 may use graphics application programming interface (API) 26 to invoke GPU driver 28. Example graphics APIs include an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), RenderScript or any other heterogeneous computing APIs, or any other public or proprietary standard graphics or compute API.

GPU driver 28 may issue one or more commands to GPU 14 for rendering one or more graphics primitives into displayable graphics images. For example, software applications 24 may invoke GPU driver 28, via graphics API 26, to provide primitive definitions to GPU 14. In some instances, GPU driver 28 may provide primitive definitions to GPU 14 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Hence, based on the instructions issued by software applications 24 to GPU driver 28, GPU driver 28 may formulate one or more commands that specify one or more operations for GPU 14 to perform in order to render the primitive.

In some examples, GPU driver 28 may include a compiler configured to compile the commands as one or more shader programs, and to download the compiled shader programs to GPU 14. The compiled shader programs may include one or more instructions that control the operation of shader units 32 within GPU 14. The shader programs may be written in a high level shading language, such as, e.g., an OpenGL Shading Language (GLSL), a High Level Shading Language (HLSL), a C for Graphics (Cg) shading language, an OpenCL C kernel, etc.

GPU 14 includes shader units 32 for executing the shader programs. In some examples, shader units 32 may be referred to "unified shaders," and may perform a variety of shading operations for rendering graphics. For example, shader units 32 may execute the shader programs to implement a variety of shader stages (which may collectively be referred to as a shader pipe) of a graphics processing pipeline. The shader programs may include vertex shader programs that may be executed by shader units 32 to perform the functions of a vertex shader stage, hull shader programs that may be executed by shader units 32 to perform the functions of a hull shader stage, domain shader programs that may be executed by shader units 32 to perform the functions of a domain shader stage, geometry shader programs that may be executed by shader units 32 to perform the functions of a geometry shader stage and/or pixel shader programs that may be executed by shader units 32 to perform the functions of a pixel shader.

In the example of FIG. 1, shader units 32 each have shader processors 34 and a texture unit 36 having constant unit 38. Shader processors 34 may include a plurality of processing elements for operating on multiple vertices or pixels in a parallel manner. For example, shader processors 34 may each include one or more components for fetching and decoding operations, one or more ALUs for carrying out arithmetic calculations, one or more memories, caches, and registers.

Texture unit 36 may include one or more hardware units separate from shader processors 34 that are configured to operate on one or more texture data, such as one or more of texture data 40A-40N ("texture data 40") stored to graphics memory 42. Texture unit 36 may include both programmable and fixed function hardware designed to apply textures (texels) to pixels. In some examples, texture unit 36 may be a dedicated set of hardware units that are dedicated to operating on texture data 40, such as dedicated to performing texture filtering on texture data 40 or configured to calculate dot products of texture data 40 and the like. As described below with respect to FIG. 2, texture unit 36 may include a texture data cache and logic (e.g., adders, multipliers, and/or other digital circuitry) for performing operations on texture data 40. While texture unit 36 is shown in the example of FIG. 1 as being included in shader units 32, it should be understood that, in other examples, texture unit 36 may also be disposed outside of shader units 32.

Each of texture data 40A-40N may comprise texture elements, also referred to as texels, which are the fundamental units of texture space. Each of texture data 40A-40N may be, but is not necessarily limited to, a one-dimensional, two-dimensional, or three-dimensional texture, or a one-dimensional, two-dimensional, or three-dimensional array of texture. Texture data 40 may include multiple textures (e.g., textures 40A, 40B, etc.). In one example, a texture data (e.g., texture data 40A) of texture data 40 may include an array of texture elements, also known as texels, which contain color and alpha values for the texture data.

In some examples, each texture data of texture data 40A-40N may be a two-dimensional image that GPU 14 maps to three-dimensional graphics. For instance, a pixel in a texture data (e.g., texture data 40A), also referred to as a texel, may be identified by a (u, v) coordinate, and a texture data (e.g., texture data 40A) may be made up of an array of texels. In some examples, GPU 14 may map the (u, v) coordinates of the array of texels of a texture data (e.g., texture data 40A) to (x, y, z, w) coordinates. GPU 14 may also perform additional graphics processing on the texels of a texture data (e.g., texture data 40A) (e.g., additional graphics processing on the red-green-blue (RGB) values of the texels). In some examples, a block may include one or more texels, so that a texture may include multiple blocks that each includes one or more texels. In some examples, a block may include a quad, which may be a block of four texels.

Graphics memory 42 may be an on-chip storage or memory that physically integrated into the integrated circuit of GPU 14 for storing texture data 40 and/or pixel data. Because graphics memory 42 is on-chip, GPU 14 may be able to read values from or write values to graphics memory 42 more quickly than reading values from or writing values to system memory 16 via a system bus.

In operation, texture unit 36 may perform texture filtering (also referred to as texture smoothing) on texture data 40 to determine a texture color for a texture mapped pixel using colors of nearby texels. Texture unit 36 may output the result of operating on the one or more texture data 40. In some instances, shader processors 34 may instruct texture unit 36 to perform operations on texture data 40, and texture unit 36 may send the results of operating on texture data 40 to shader processors 34 for further processing, e.g., for shading operations.

As noted above, texture unit 36 may typically be limited to performing a particular set of operations, e.g., associated with a texture pipe for filtering texture data 40. For example, texture unit 36 may include dedicated hardware for performing texture filtering, whereby one or more texel values (e.g., of texture data 40) are multiplied by one or more filter coefficient values. Texture unit 36 may store filtering results in an accumulator, and add the filtering results to produce a final filtered texel. Texture unit 36 may store the output to graphics memory 42 or pass the output to shader processors 34 for further operations.

In some instances, texture unit 36 may send the output to shader processors 34 to perform a multiplication operation. For example, shader processors 34 may multiply output from texture unit 36 by a constant associated with a color or lighting gain (or for any other reason). In this example, GPU 14 may utilize one or more components for fetching and decoding operations, one or more ALUs for carrying out arithmetic calculations, one or more memories, caches, and registers to apply the constant, which, in some instances, may be relatively inefficient.

According to aspects of this disclosure, texture unit 36 may be configured to multiply texture data 40 (e.g., including one or more texels) by one or more constants. As described herein, a constant may be any real number or set of real numbers not associated with a filtering operation. Texture unit 36 may use constant unit 38 to multiply texture data 40 by the one or more constants.

Constant unit 38 may include programmable or fixed function hardware for performing the multiplication. In some examples, constant unit 38 may incorporate at least some of the circuitry of texture unit 36 that is used to perform filtering operations. That is, as noted above, texture unit 36 may include programmable or fixed function logic for filtering texture data 40, and constant unit 38 may reuse at least some of such hardware. In an example, as described in greater detail below with respect to FIG. 2, constant unit 38 may include multiplier logic that is used for trilinear filtering of texture data 40 to also multiply texture data 40 by the one or more constants.

Constant unit 38 may apply one or more constants, as specified by software applications 24. For example, software applications 24 may include one or more drawing instructions that instruct GPU 14 to render or manipulate a graphics scene (e.g., apply a gain to a graphics scene). According to aspects of this disclosure, graphics API 26 may invoke GPU driver 28 with instructions to multiply texture data 40 with one or more constants. In some examples, graphics API 26 may designate constant unit 38 to perform the multiplication (rather than, for example, shader processors 34).

GPU driver 28 may issue one or more commands to GPU 14 for multiplying texture data 40 by the one or more constants. Constant unit 38 may multiply texture data 40 by the one or more constants fetched from constant buffer 44 in accordance with the commands received from GPU driver 28. Constant buffer 44 may include one or more registers for storing the constants. Constants stored to constant buffer 44 may each include an index.

In some examples, constant unit 38 may fetch the one or more constants from constant buffer 44. In other examples, a processing unit associated with shader processors 34 may be responsible for fetching the one or more constants from constant buffer 44. For example, a constant fetch unit responsible for fetching constants for shader processors 34 may also be responsible for fetching constants for constant unit 38. This constant fetch unit may be a separate processing unit from texture unit 36. In still other examples, GPU driver 28 may load constants from constant buffer 44 to texture unit 36.

In some examples, constant unit 38 may multiply texture data 40 by a single constant. In other examples, constant unit 38 may multiply texture data 40 by more than one constant. For example, constant unit 38 may multiply each element of an array of texture data 40 (e.g., an alpha element, a red element, a green element and a blue element) by a respective constant, which may vary by component. In some examples, constant unit 38 may multiply fewer than all elements of texture data 40 by one or more constants.

In some examples, constant unit 38 may include swizzle logic to increase flexibility. For example, the swizzle logic may allow constant unit 38 to multiply any component of texture data 40 to any constant of a set of constants. In an example for purposes of illustration, texture data 40A may include an alpha component, a red component, a green component and a blue component. Constant unit 38 may initially be configured to apply a first constant to the alpha component, a second constant to the red component, a third constant to the green component, and a fourth constant to the blue component. Constant unit 38 may use swizzle logic to, as an example, instead apply the third constant to the alpha component, or any other variation thereof.

In this way, according to aspects of this disclosure, hardware capability is incorporated to texture unit 36 that allows texture unit 36 to perform a constant multiply on texture output. In some examples, texture unit 36 may operate with dedicated hardware to perform an initial texture fetch of texture data 40 (which may also be included in constant unit 38). In such examples, GPU 14 may execute a shader program for multiplying texture data 40 by a constant without any use of shader processors 34, which may result in a power savings (versus powering shader processors 34 to perform the multiplication). That is, GPU 14 may bypass shader processors 34, thereby leaving shader processors 34 idle and/or allowing shader processors 34 to perform other shading operations concurrently with the multiplication.

Figure 2:
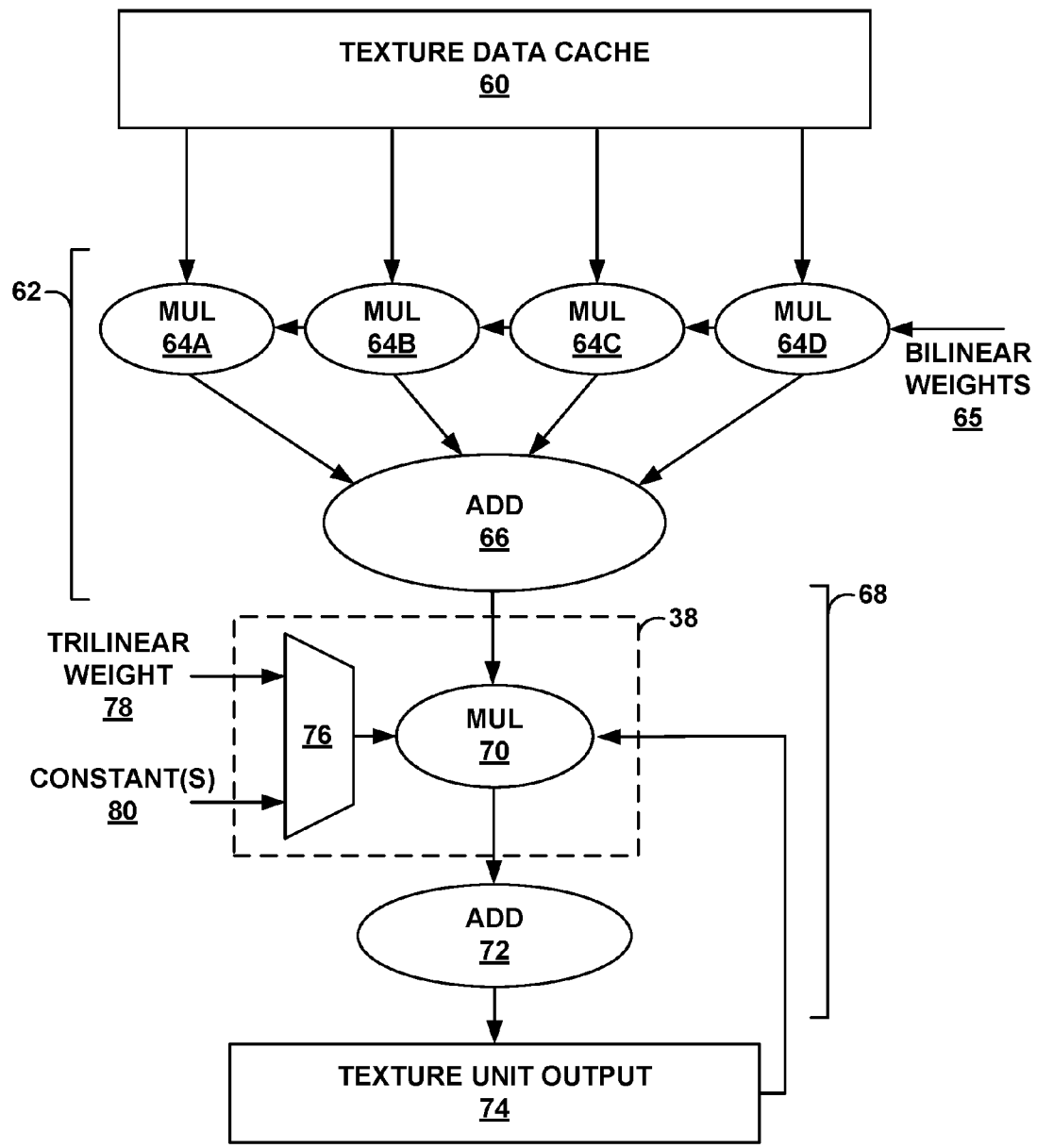
FIG. 2 is a conceptual diagram illustrating an example texture unit, according to aspects of this disclosure.

FIG. 2 is a conceptual diagram illustrating texture unit 36 of FIG. 1 in greater detail. In the example of FIG. 2, texture unit 36 includes texture data cache 60, bilinear filtering logic 62 including multipliers (MUL) 64A-64D (collectively, multipliers 64) and accumulator (ADD) 66, trilinear filtering logic 68 including multiplier 70 and accumulator 72, and texture unit output 74. Texture unit 36 also includes a multiplexer 76 that receives trilinear weight 78 and one or more constants 80 as inputs. It should be understood that the components shown in the example of FIG. 2 are provided for purposes of illustration, and other texture units having more, fewer, or an alternative arrangement of components may be used to carry out the techniques described herein for multiplying texture data by one or more constants.

Texture data cache 60 may be configured to store texture data 40. In some examples, texture data cache 60 may be a level one (L1) cache, which may store texture data 40 retrieved from graphics memory 42.

Bilinear filtering logic 62 may be used to apply bilinear filtering to texels of texture data 40. For example, texel coordinates may typically be stored at a certain precision (e.g., 8:8 fixed point). In some instances, texture unit 36 may only use the integer portion to index the texels during texel fetching. With bilinear interpolation, texture unit 36 may fetch four texels and use the fractional portion of the texel coordinate to determine a weight factor for each of the four texels, so that the final value of the texel is a mix of the four fetched texels.

In the example of FIG. 2, multipliers 64 may receive four texels (e.g., of texture data 40) from texture data cache 60, as well as corresponding bilinear weights 65 (also referred to as filter coefficient values). Multipliers 64 may multiply the texels by the appropriate bilinear weights 65 and send the results to accumulator 66. Accumulator 66 may add the results to produce a final bilinearly filtered texel.

In some examples, bilinear filtering logic 62 may send the filtered texel to trilinear filtering logic 68, which may be configured to apply trilinear filtering to texels of texture data 40. That is, trilinear filtering logic 68 may interpolate the results of bilinear filtering using multiplier 70 and trilinear weight 78. Accumulator 72 may add the results to produce a final trilinearly filtered texel.

The results of filtering using bilinear filtering logic 62 and trilinear filtering logic 68 (in instances in which trilinear filtering is performed) may be output to texture unit output 74. In some examples, as noted above, texture unit output 74 may pass the filtered texture data to shader processors 34 for further processing.

According to aspects of this disclosure, texture unit 36 also includes constant unit 38, which may be used to multiply texture data 40 by one or more constants 80. In the example of FIG. 2, constant unit 38 includes multiplier 70 and multiplexer 76. Multiplexer 76 may multiplex trilinear weight 78 and constants 80. For example, multiplexer 76 may provide either trilinear weight 78 or constants 80 to multiplier 70, depending on whether trilinear filtering or constant multiplication is to be performed for a particular processing cycle. In this example, constant unit 38 may leverage multiplier 70 from trilinear filtering logic 68 to apply texels by constants 80. In some examples, constant unit 38 may also include one or more components for fetching constants 80 from constant buffer 44.

Texture unit 36 may use constant unit 38 to multiply unfiltered texture data, bilinearly filtered texture data, or trilinearly filtered texture data by one or more constants 80. For example, texture unit 36 may pass unfiltered texture data 40 from texture data cache 60 to multiplier 70 without applying bilinear weights 65. In this example, multiplexer 76 may provide constants 80 to multiplier 70, and multiplier 70 may multiply the unfiltered texture data 40 by constants 80.

In instances in which texture unit 36 performs bilinear filtering, multipliers 64 may multiply texels from texture data cache 60 by the appropriate bilinear weights 65 and send the results to accumulator 66. Accumulator 66 may add the results to produce bilinearly filtered texture data. Multiplexer 76 may provide constants 80 to multiplier 70, and multiplier 70 may multiply the result from bilinear filtering logic 62 by the constants 80 received from multiplexer 76. In this way, constant unit 38 may multiply bilinearily filtered texture data by one or more constants.

In instances in which texture unit 36 performs trilinear filtering, multiplexer 76 may provide trilinear weight 78 to multiplier 70. Multiplier 70 may apply trilinear weight 78 to the result from bilinear filtering logic 62. Accumulator 72 may add the results to produce trilinearly filtered texture data. Multiplexer 76 may also provide constants 80 to multiplier 70, and multiplier 70 may multiply the result from trilinear filtering logic 68 by the constants 80 received from multiplexer 76. In this way, constant unit 38 may multiply trilinearly filtered texture data by one or more constants.

In some instances, texture unit 36 may perform trilinear filtering using two processing cycles in order to blend two different mipmaps (e.g., sequences of texture at different resolutions). For example, texture unit 36 may carry out two processing cycles to execute the following equation:

Tri-weight_for_Map_n*Bilinear_filtered_texel_for_Map_n+Tri-weight_for_Map_n−1*Bilinear_filtered_texel_for_Map_n−1

When added together, trilinear weights 78 (i.e., Tri-weight_for_Map_n and Tri-weight_for_Map_n−1) may typically equal 1.0.

Texture unit 36 may perform the first half of the equation above in a first processing cycle and the second half of the equation above in a second processing cycle. For example, in a first processing cycle, multiplexer 76 may provide a first trilinear weight 78 (e.g., Tri-weight_for_Map_n) to multiplier 70 and multiplier 70 may apply the first trilinear weight 78 to a bilinearly filtered texel of a first mipmap (e.g., Bilinear_filtered_texel_for_Map_n). No addition is performed in the first processing cycle. In a second processing cycle, multiplexer 76 may provide a second trilinear weight 78 (e.g., Tri-weight_for_Map_n−1) to multiplier 70 and multiplier 70 may apply the second trilinear weight 78 to a bilinearly filtered texel of a second mipmap (e.g., Bilinear_filtered_texel_for_Map_n−1). In addition, accumulator 72 may add the weighted bilinearly filtered texels.

According to aspects of this disclosure, texture unit 36 may perform an additional processing cycle to multiply the trilinearily filtered data by one or more constants 80. For example, in a third processing cycle, multiplexer 76 may provide constants 80 to multiplier 70. Multiplier 70 may multiply constants 80 by the trilinearily filtered texture data, e.g., from the first two processing cycles.

Figure 3A:
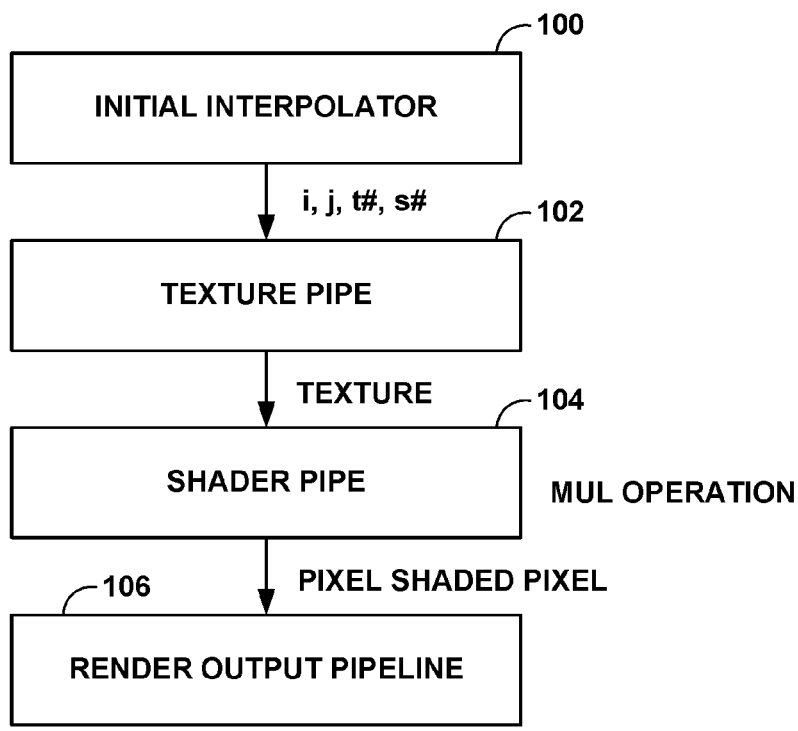
FIGS. 3A and 3B are flow diagrams illustrating example operations of a GPU.
Figure 3B:
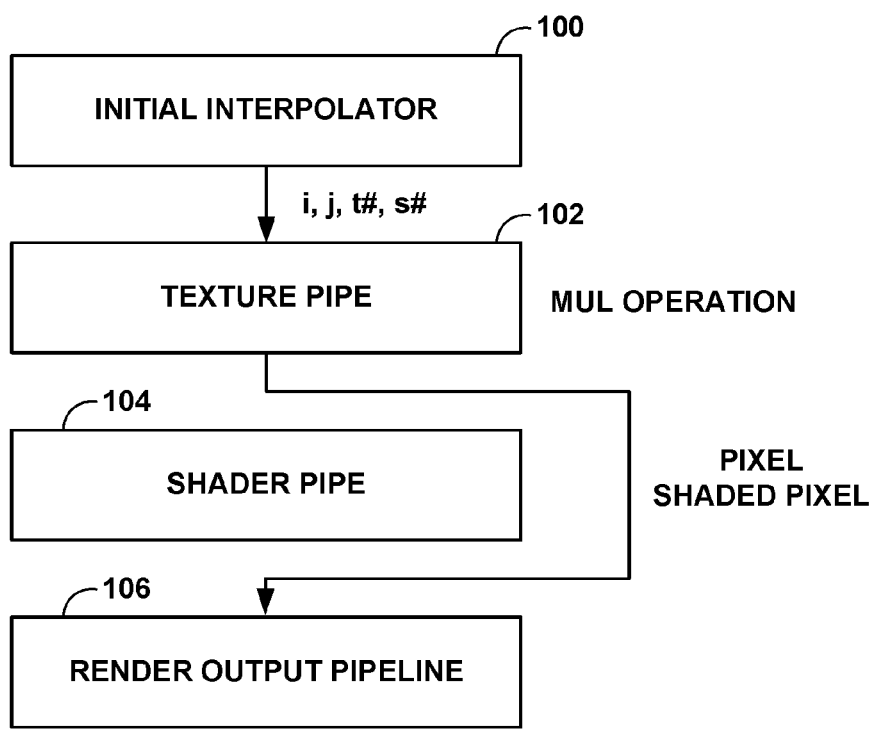

FIGS. 3A and 3B are flow diagrams illustrating examples of multiplying texture data by a constant. In the example of FIG. 3A, an initial interpolator 100 may perform an initial texture fetch of texture data. According to aspects of this disclosure, initial interpolator 100 may comprise dedicated hardware for performing the texture fetch, such that a shader processor of a GPU (e.g., shader processors 34 of GPU 14) does not need to be powered to fetch the texture data. The texture data may include i and j coordinates that specify a location within a texture surface, and texture identifiers t# and s# that specify a particular texture from a set of textures.

Texture pipe 102 may, in some examples, correspond to texture unit 36 of GPU 14 (FIG. 2). Texture pipe 102 may be configured to map texture data (such as texture data 40) and apply one or more filters to the texture data. For example, texture pipe 102 may perform bilinear filtering, trilinear filtering, and/or other filtering operations.

In the example, of FIG. 3A, shader pipe 104 may receive the texture data from texture pipe 102. Shader pipe 104 may multiply the texture data by one or more constants. For example, ALUs of shader pipe 104 may perform a MUL operation to multiply the texture data by the one or more constants. Shader pipe 104 may then pass pixel shaded pixels to render output pipeline 106. Render output pipeline 106 may perform antialiasing or other operations to merge sample values prior to being written to a frame buffer, such as frame buffer 18 (FIG. 1).

According to aspects of this disclosure, as shown in the example of FIG. 3B, texture pipe 102 may be modified to perform multiplication by one or more constants. For example, as described above with respect to FIG. 2, texture pipe 102 may be configured to reuse certain hardware from texture filtering units to perform constant multiplication. In such an example, initial interpolator 100 may be responsible for fetching the texture data and texture pipe 102 may be responsible for multiplying the texture data by one or more constants. Accordingly, a GPU may bypass shader pipe 104 and pass the pixel shaded pixel directly to render output pipeline 106. In this example, shader pipe 104 may perform shading operations concurrently with the multiplication performed by texture pipe 102.

Figure 4:
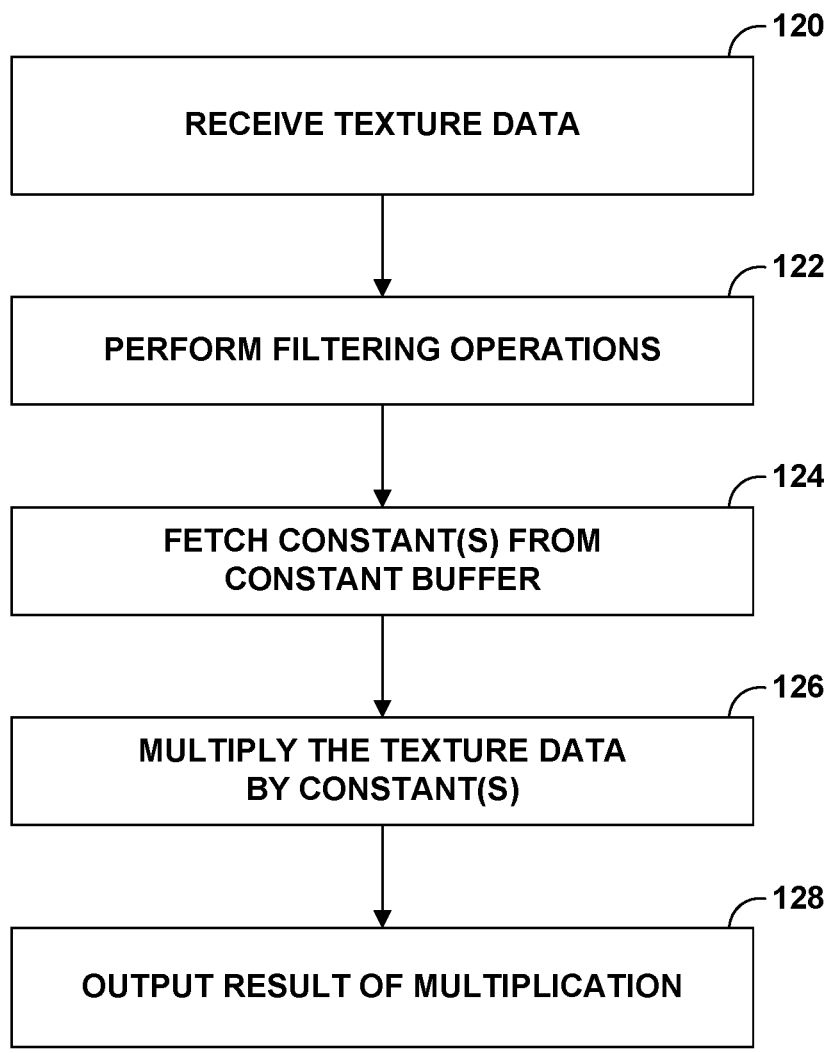
FIG. 4 is a flowchart illustrating a process for a texture unit to perform multiplication operations, according to aspects of this disclosure.

FIG. 4 is a flowchart illustrating a process for a texture unit to perform multiplication operations, according to aspects of this disclosure. While the process is described with respect to GPU 14 and texture unit 36 (FIG. 1), it should be understood that the process may likewise by carried out be a variety of other processors and/or circuitry.

In the example of FIG. 4, texture unit 36 may receive texture data 40 (120). In some examples, texture unit 36 may be configured with hardware to fetch texture data 40 from graphics memory 42. Texture data 40 may include arrays of texels of a variety of colorspaces. Texture unit 36 may, in some instances, also perform filtering operations (122). For example, texture unit 36 may perform bilinear filtering, trilinear filtering, or any other filtering operations to filter texture data 40.

According to aspects of this disclosure, constant unit 38 of texture unit 36 may fetch one or more constants from a constant buffer (124). In addition, constant unit 38 may multiply texture data by the one or more constants (126). For example, constant unit 38 may leverage filtering logic of texture unit 36 to perform the multiplication. Texture unit 36 may then output the result of the multiplication (128). For example, texture unit 36 may output the result to a raster operations pipeline and bypass a shader pipe configured to receive texture data from texture unit 36.

It should be understood that the techniques shown in FIG. 4 are provided for purposes of illustration only. In other examples, the process may include more, fewer, or an alternative arrangement of steps than those show. For example, as described above, filtering operations may not be performed for all texture data.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other embodiments are within the scope of the following claims.

What is claimed is:

1. A method of processing graphics data, the method comprising:

receiving, by a graphics processing unit (GPU) that includes a shader unit, a compiled shader program, the shader unit including one or more shader processors and a texture unit, the compiled shader program being written for execution on the one or more shader processors;

fetching, by the texture unit, texture data from a graphics memory, wherein the texture unit includes one or more hardware units separate from any shader processor of the GPU, wherein the one or more hardware units included in the texture unit include dedicated hardware for performing texture filtering;

executing the compiled shader program by the GPU, wherein execution of the compiled shader program by the GPU causes the one or more hardware units included in the texture unit to multiply the texture data by at least one constant, wherein the one or more hardware units in the texture unit are configured to multiply the texture data by the at least one constant after the one or more hardware units included in the texture unit apply a texture filtering operation to the texture data, and wherein the texture data comprises at least one texel; and outputting, by the texture unit to a raster operations pipeline and bypassing any shader processor in the GPU, a result of multiplying the texture data by the at least one constant, wherein the result comprises a product of the texture data and the constant.

2. The method of claim 1, further comprising performing, by the texture unit, at least one texture filtering operation on the at least one texel to generate at least one filtered texel, and wherein multiplying the texture data by the at least one constant comprises multiplying the at least one filtered texel by the at least one constant.

3. The method of claim 2, wherein performing the at least one texture filtering operation comprises applying at least one of a bilinear filtering operation or a trilinear filtering operation.

4. The method of claim 1, further comprising performing a trilinear filtering operation using a multiplier circuit in one or more first processing cycles, and wherein multiplying the texture data by the at least one constant comprises multiplying the texture data by the at least one constant using the multiplier circuit in a second processing cycle that is separate from the one or more first processing cycles.

5. The method of claim 1, further comprising receiving the at least one constant from a multiplexer circuit that multiplexes the at least one constant and a trilinear weight for a trilinear filtering operation.

6. The method of claim 1, further comprising fetching, by the texture unit, the at least one constant from a constant buffer.

7. The method of claim 1, further comprising fetching, by a processing unit that is separate from the texture unit, the at least one constant from a constant buffer.

8. The method of claim 1, wherein the at least one texel comprises a plurality of texels and the at least one constant comprises a plurality of constants, and wherein multiplying the texture data comprises multiplying each texel of the plurality of texels by a respective constant of the plurality of constants.

9. The method of claim 1, further comprising performing, concurrently with the multiplying, a shading operation by a shader processor of the one or more shader processors, wherein the shader processor is configured to receive an output from the texture unit.

10. A computing device for processing graphics, the computing device comprising:
a memory configured to store texture data;
a shader unit that comprises one or more shader processors and a texture unit,
wherein the texture unit is configured to:
fetch the texture data from the memory;
wherein:
one or more hardware units included in the texture unit include dedicated hardware for performing texture filtering, the one or more hardware units being separate from any shader processor in a graphics processing unit,
the texture unit includes a multiplier circuit, and
execution of a compiled shader program by the computing device causes the multiplier circuit to multiply the texture data by at least one constant, wherein the multiplier circuit is configured to multiply the texture data by the at least one constant after the texture unit applies a texture filtering operation to the texture data, and wherein the texture data comprises at least one texel, the shader program being written for execution on the one or more shader processors; and output, to a raster operations pipeline and bypassing any shader processor in the computing device, a result of multiplying the texture data by the at least one constant, wherein the result comprises a product of the texture data and the constant.

11. The computing device of claim 10, wherein the texture unit is further configured to perform at least one texture filtering operation on the at least one texel to generate at least one filtered texel, and wherein to multiply the texture data by the at least one constant, the texture unit is configured to multiply the at least one filtered texel by the at least one constant.

12. The computing device of claim 11, wherein to perform the at least one texture filtering operation, the texture unit is configured to apply at least one of a bilinear filtering operation or a trilinear filtering operation.

13. The computing device of claim 10, wherein the texture unit is further configured to perform a trilinear filtering operation using the multiplier circuit in one or more first processing cycles, and wherein to multiply the texture data by the at least one constant, the texture unit is configured to multiply the texture data by the at least one constant using the multiplier circuit in a second processing cycle that is separate from the one or more first processing cycles.

14. The computing device of claim 10, wherein the texture unit further comprises a multiplexer circuit configured to multiplex the at least one constant and a trilinear weight for the trilinear filtering operation, and to transmit the at least one constant to the multiplier circuit.

15. The computing device of claim 10, wherein the texture unit is further configured to fetch the at least one constant from a constant buffer.

16. The computing device of claim 10, further comprising a constant fetch processing unit that is separate from the texture unit, wherein the constant fetch processing unit is configured to fetch the at least one constant from a constant buffer.

17. The computing device of claim 10, wherein the at least one texel comprises a plurality of texels and the at least one constant comprises a plurality of constants, and wherein to multiply the texture data, the texture unit is configured to multiply each texel of the plurality of texels by a respective constant of the plurality of constants.

18. The computing device of claim 10, wherein a shader processor of the one or more shader processors is configured to receive an output from the texture unit and perform, concurrently with the multiplying, a shading operation.

19. A non-transitory computer-readable medium having instructions stored thereon that, when executed, cause one or more processors to:
receive, by a graphics processing unit (GPU) that includes a shader unit, a compiled shader program, the shader unit including one or more shader processors and a texture unit, the compiled shader program being written for execution on the one or more shader processors;
fetch, by the texture unit, texture data, wherein the texture unit includes one or more hardware units separate from any shader processor in the GPU, wherein the one or more hardware units included in the texture unit include dedicated hardware for performing texture filtering;

execute the compiled shader program by the GPU, wherein execution of the compiled shader program by the GPU causes the one or more hardware units included in the texture unit to multiply the texture data by at least one constant, wherein the one or more hardware units in the texture unit are configured to multiply the texture data by the at least one constant after the one or more hardware units included in the texture unit apply a texture filtering operation to the texture data, and wherein the texture data comprises at least one texel; and output, by the texture unit to a raster operations pipeline and bypassing any shader processor in the GPU, a result of multiplying the texture data by the at least one constant, wherein the result comprises a product of the texture data and the constant.

20. The non-transitory computer-readable medium of claim 19, wherein the instructions further cause the texture unit to perform at least one texture filtering operation on the at least one texel to generate at least one filtered texel, and wherein to multiply the texture data by the at least one constant, the instructions cause the texture unit to multiply the at least one filtered texel by the at least one constant.

21. The non-transitory computer-readable medium of claim 20, wherein to perform the at least one texture filtering operation, the instructions cause the texture unit to apply at least one of a bilinear filtering operation or a trilinear filtering operation.

22. The non-transitory computer-readable medium of claim 19, wherein the instructions further cause the texture unit to perform a trilinear filtering operation using a multiplier circuit in a first processing cycle, and wherein to multiply the texture data by the at least one constant, the instructions cause the texture unit to multiply the texture data by the at least one constant using the multiplier circuit in a second processing cycle.

23. The non-transitory computer-readable medium of claim 19, wherein the instructions further cause a multiplexer circuit to multiplex the at least one constant and a trilinear weight for the trilinear filtering operation, and to transmit the at least one constant to a multiplier circuit in the texture unit.

24. The non-transitory computer-readable medium of claim 19, wherein the instructions further cause the texture unit to fetch the at least one constant from a constant buffer.

25. The non-transitory computer-readable medium of claim 19, wherein the instructions further cause a constant fetch processing unit that is separate from the texture unit to fetch the at least one constant from a constant buffer.

26. The non-transitory computer-readable medium of claim 19, wherein the at least one texel comprises a plurality of texels and the at least one constant comprises a plurality of constants, and wherein to multiply the texture data, the instructions cause the texture unit to multiply each texel of the plurality of texels by a respective constant of the plurality of constants.

27. The non-transitory computer-readable medium of claim 19, wherein the instructions further cause a shader processor of the one or more shader processors to receive an output from the texture unit and perform, concurrently with the multiplying, a shading operation.

* * * * *